July 17, 1923.
C. P. DROS
1,462,196
FISHING APPARATUS
Original Filed March 29, 1919
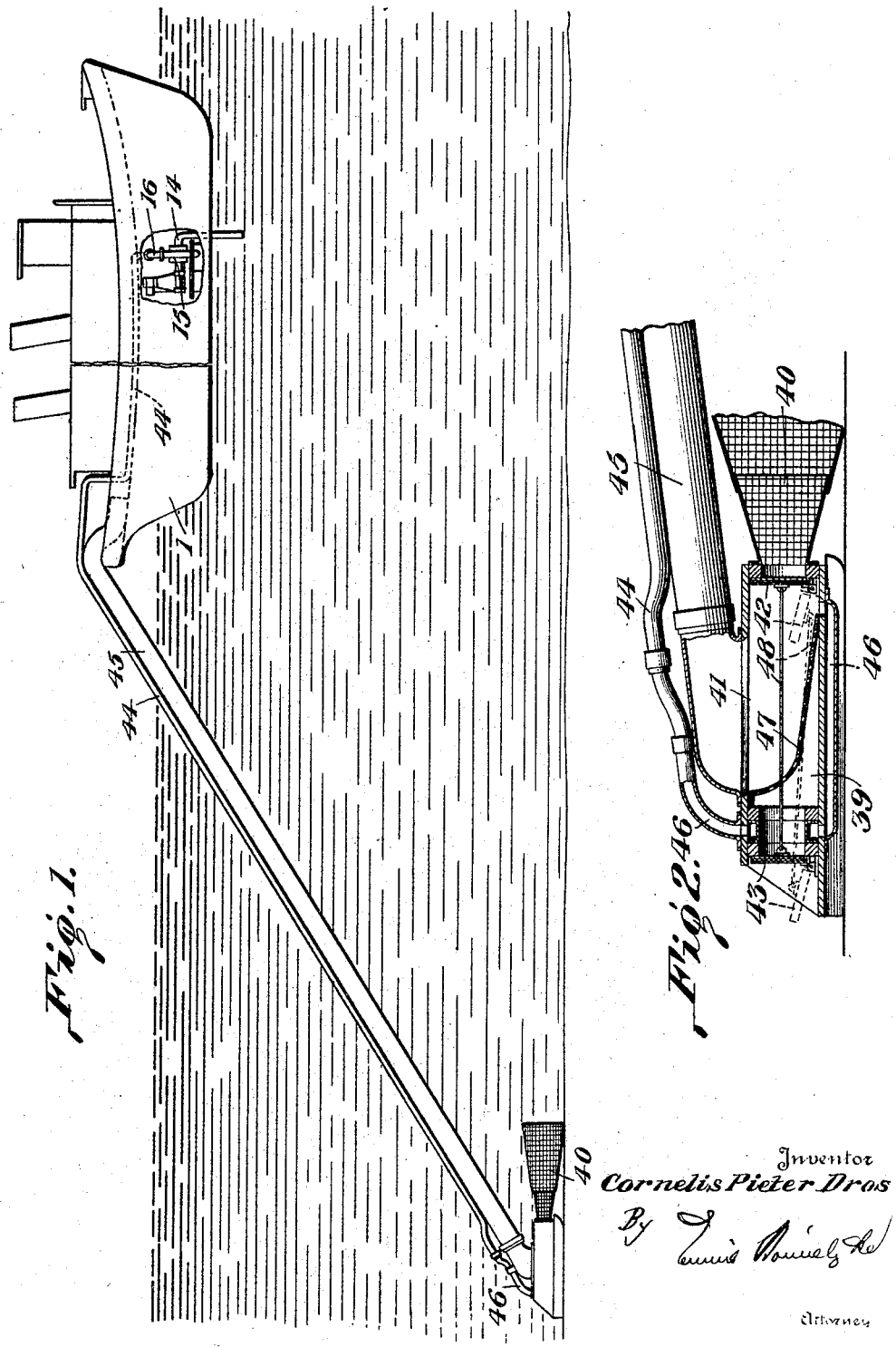

Patented July 17, 1923.

1,462,196

UNITED STATES PATENT OFFICE.

CORNELIS P. DROS, OF AMSTERDAM, NETHERLANDS.

FISHING APPARATUS.

Original application filed March 29, 1919, Serial No. 286,154. Divided and this application filed September 10, 1920. Serial No. 409,400.

*To all whom it may concern:*

Be it known that I, CORNELIS PIETER DROS, a subject of the Queen of Holland, residing at Amsterdam, Netherlands, have invented certain new and useful Improvements in Fishing Apparatus, of which the following is a specification.

This invention relates to apparatus for catching fish; and its object, stated briefly, is the provision of an improved apparatus of the general character indicated which is so constructed as to overcome the main disadvantages inherent in trawl fishing as usually carried out, viz: the necessity for periodically drawing in the net, emptying it and re-casting it; the liability of the fish being injured or dead when hauled in; the inability to determine the presence or absence of fish in the water through which the net is being drawn; and the great resistance offered by the net to its passage through the water.

Attempts have been made to design trawl-fishing apparatus in which one or more of the above objectionable features are avoided; but such attempts have hitherto proven unsuccessful, especially in the case of apparatus for deep-sea fishing, and the apparatus, moreover, have been found unseaworthy and unsatisfactory for use in rough weather. According to the present invention, however, the improved fishing apparatus comprises a catching or receiving compartment immediately in rear of the net, and the fish are discharged from this compartment by water pressure and caused to travel in a definite path to the trawling vessel; for which purpose a tubular conduit is connected at its inlet end with said compartment and has its discharge end disposed upon the deck of the vessel, and a second pipe or conduit is provided which communicates at one end with a marine pump on board the vessel and at its other end with the catching compartment. A system of valves is employed for controlling the passage of the sea water, pressure water and fish into and through the compartment and through the pipes; the arrangement being such that during the towing of the net through the water, the latter opens the valves and then makes its way through the compartment, the fish also entering the compartment at the same time, but being retained therein, instead of flowing out with the water. The pressure water is then admitted to the compartment and immediately acts to close the valves, after which it forces the fish up through the delivery conduit and discharges them upon the deck of the vessel, whence they may be transported, automatically or otherwise, to the fish holds for storage.

The present application is essentially a division of my Patent, No. 1,388,414, granted August 23, 1921, and it is to be so considered. Reference to said patent may be had for an understanding of the complete invention, including details of various attachments and adjuncts which form parts of the invention in its broad aspect, and which are therein claimed, but which are omitted herefrom, as the present case is limited to the construction of the catching compartment and the arrangement of the associated piping and valve systems.

An embodiment of the present invention is illustrated in the accompanying drawing, in which:

Figure 1 is a view showing the complete apparatus in use.

Fig. 2 is an enlarged longitudinal section of the catching compartment and its associated pipes or conduits and valves.

Referring more particularly to the drawing, 1 indicates, in a general manner, the trawler or other vessel, and 15 a marine centrifugal pump mounted on board the vessel below the deck thereof and having its inlet or suction side in communication with the sea through suitable piping 14. The delivery pipe 16 of the pump is connected to one end of the tubular pipe or conduit 44 which supplies the pressure water to the hereinafter-described catching compartment.

The latter, as shown in Fig. 2, takes the form of a box which is divided interiorly by a curved grating 47 into front and rear chambers 41 and 39, the first of which constitutes the catching compartment proper and is attached at its front end to the rear portion of the net 40. Communication between the net and the chamber or compartment 41 is controlled by a flap valve 42, and a similar valve 43 is employed to close and open the rear end of the chamber 39, the two valves being connected together by a rod or chain 48. The chamber 39 has connected to it a tube or pipe 46 of substantially the same diameter as the pressure-water conduit 44 and comprising upper and lower sections or members and an intermediate annular section or member which passes around the chamber at the rear, the lower section leading forwardly and opening at its front end into the front end of the catching compartment or chamber 41. The upper section is connected to the lower end of pipe 44.

In addition to the parts just described, the apparatus also includes a delivery pipe or conduit 45, of relatively large diameter as compared with the pressure water pipe or conduit 44, which communicates at its lower end with the top of the catching compartment or chamber 41, and which is utilized to convey the fish from said compartment to the vessel, for which purpose its upper or discharge end is supported upon the deck of the vessel. This pipe or conduit 45 is flexible, and its construction is preferably the same as that of the siphon pipe 2 disclosed in my above-identified patent; the objects being to prevent the pipe from collapsing when in use, to protect it against the corrosive action of the sea water, to enable its degree of submergence to be controlled and to permit it to be cast and hauled in readily and without danger of being injured thereby. The precise details of such construction constitute in themselves no part of the present invention, as they are covered by the claims in the said patent, for which reason they are neither illustrated nor described specifically herein. Similarly, it will be understood that the trawl lines and trawl boards, the lights carried by the latter for attracting the fish toward the net, and the other adjuncts and attachments shown in connection with the catching compartment in the patent will, or may, actually be used with the construction herein disclosed; but that they are omitted herefrom for convenience of illustration.

In operation, the net is towed through the water which first opens the front valve 42 and then passes through the grating 47 and forces open the rear valve 43; the water thus escaping through the opening controlled by the latter valve and, consequently, being prevented from backing up in the catching compartment or chamber 41. The fish also enter said chamber; but since they cannot escape through the grating 47 with the water, they will remain in the chamber and will collect therein and in the lower end of the conduit 45. To empty the chamber or compartment, the outlet valve of the pump is opened and water is forced under pressure through pipes 44 and 46 into and through chamber or compartment 39 and thence into compartment 41. On entering the latter compartment, the pressure water will act against the inlet valve 42 to close the same, the closing of valve 42 in turn effecting the closing of the outlet valve 43, due to the connection 48 between them. Hence the water, in escaping, will be compelled to flow through the conduit 45, forcing the fish therethrough ahead of it and discharging them upon the deck of the vessel, where the water may be drained off in some suitable way. The fish may, if desired, be then transported, automatically or otherwise, by means of known devices, to the fish holds for storage.

I claim as my invention:—

1. In a fishing apparatus, the combination of a catching station; a net having a catching compartment; a discharge conduit for the fish having its inlet end connected to said compartment and its outlet end arranged at said station; a pressure fluid supply pipe connected at its outlet end to said compartment; and a pump at said station to which the inlet end of said supply pipe is connected; said pump acting to deliver pressure fluid through said pipe into said compartment, to force the fish therein into and through said conduit and to discharge them at said station.

2. In a fishing apparatus, the combination of a net having a catching compartment and adapted to be towed through the water behind a trawler; a discharge conduit for the fish connected at its inlet end to said compartment and having its outlet end disposed upon the deck of the trawler; a pump on the trawler; and piping connections between the pump and said compartment for delivering a pressure fluid to the latter from said pump to force the fish in said compartment into and through said conduit and to discharge them at said station.

3. In a fishing apparatus, the combination of a net having a catching compartment; a discharge conduit for the fish leading from said compartment; a valve system for controlling the entrance of fish and sea water into said compartment, and the escape of the sea water from said compartment, said valve system opening automatically under the external pressure of the sea water; and means for supplying pressure fluid to said compartment, to force the fish therein into and through said conduit and to discharge them at the mouth of the conduit, said fluid acting to close said valve system on entering the compartment.

4. In a fishing apparatus, the combination of a net having a catching compartment; a discharge conduit for the fish leading from said compartment; a valve system for controlling the entrance of fish and sea water into said compartment, and the escape of the sea water from said compartment, said valve system opening automatically under the external pressure of the sea water; and a pump connected to supply a pressure fluid to said compartment, to force the fish therein into and through said conduit and to discharge them at the mouth of the conduit, said fluid acting to close said valve system on entering the compartment.

5. In a fishing apparatus, the combination of a net having a catching compartment; means for closing said compartment to prevent the entrance of fish and sea water thereinto; a discharge conduit for the fish leading from said compartment; and means for supplying pressure fluid to said compartment, to force the fish therein into and through said conduit and to discharge them at the mouth of the conduit, said fluid acting to operate said closing means.

In testimony whereof I affix my signature.

CORNELIS P. DROS.